US012345822B2

(12) United States Patent  (10) Patent No.: US 12,345,822 B2
Krishnan et al.  (45) Date of Patent: Jul. 1, 2025

(54) SENSOR ASSEMBLY WITH DEFLECTOR

(71) Applicant: Ford Global Technologies, LLC, Dearborn, MI (US)

(72) Inventors: Venkatesh Krishnan, Canton, MI (US); Segundo Baldovino, Novi, MI (US); Rashaun Phinisee, Ypsilanti, MI (US); Navvab Khajehosseini, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 862 days.

(21) Appl. No.: 17/557,292

(22) Filed: Dec. 21, 2021

(65) Prior Publication Data

US 2023/0194725 A1   Jun. 22, 2023

(51) Int. Cl.
| | | |
|---|---|---|
| *G01S 17/931* | (2020.01) | |
| *B60R 11/00* | (2006.01) | |
| *B60R 11/04* | (2006.01) | |
| *B62D 35/00* | (2006.01) | |
| *G01S 7/481* | (2006.01) | |
| *G01S 7/4865* | (2020.01) | |

(52) U.S. Cl.
CPC .......... *G01S 17/931* (2020.01); *B62D 35/005* (2013.01); *G01S 7/4813* (2013.01); *G01S 7/4817* (2013.01); *G01S 7/4865* (2013.01); *B60R 2011/004* (2013.01); *B60R 11/04* (2013.01)

(58) Field of Classification Search
CPC ... B60R 11/00; B60R 11/04; B60R 2011/004; B60R 2011/0084; B60R 2011/0092; B62D 35/005; B62D 37/02; G01S 7/4813; G01S 7/4817; G01S 7/4865; G01S 17/86; G01S 17/931; G01S 2013/93273

See application file for complete search history.

(56) References Cited

U.S. PATENT DOCUMENTS

| | | | | |
|---|---|---|---|---|
| 3,794,372 A | * | 2/1974 | Webb ................. | B62D 35/002 296/180.3 |
| 5,538,316 A | * | 7/1996 | Bartholomew ...... | B62D 35/001 296/180.5 |

(Continued)

FOREIGN PATENT DOCUMENTS

| | | |
|---|---|---|
| DE | 102018100741 A1 | 7/2019 |
| DE | 102020101511 A1 | 7/2021 |
| EP | 1170201 B1 | 12/2005 |

OTHER PUBLICATIONS

DE 4229929 C1 with English Translation (Year: 1993).*

(Continued)

*Primary Examiner* — Lori Lyjak

(74) *Attorney, Agent, or Firm* — Frank A. MacKenzie; Brooks Kushman P.C.

(57) ABSTRACT

A vehicle includes a windshield having a top edge. The vehicle includes a roof extending rearward from the top edge of the windshield. The vehicle includes a sensor assembly supported by the roof, the sensor assembly including at least one of a LIDAR sensor or a camera. The vehicle includes a deflector movable from a lowered position to a raised position and supported by the roof at the top edge of the windshield forward of and spaced from the sensor assembly.

16 Claims, 4 Drawing Sheets

(56) References Cited

U.S. PATENT DOCUMENTS

| | | | |
|---|---|---|---|
| 8,944,491 B2* | 2/2015 | Neumann | B60J 7/22 |
| | | | 296/180.5 |
| 9,399,493 B1* | 7/2016 | Milde, Jr. | B62D 25/12 |
| 10,953,809 B2 | 3/2021 | Krishman et al. | |
| 2021/0007242 A1 | 1/2021 | Diehl et al. | |
| 2022/0089129 A1* | 3/2022 | Krishnan | G01S 7/4813 |

OTHER PUBLICATIONS

Mosley et al., "Experimental Nonlinear Dynamics of a Shape Memory Alloy Wire Bundle Actuator", Journal of Dynamic Systems, Measurement, and Control, Mar. 2001, 123(1): 103-112; https://doi.org/10.1115/1.1344243; published online: Mar. 13, 1999.

* cited by examiner

SENSOR ASSEMBLY WITH DEFLECTOR

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectro-mechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
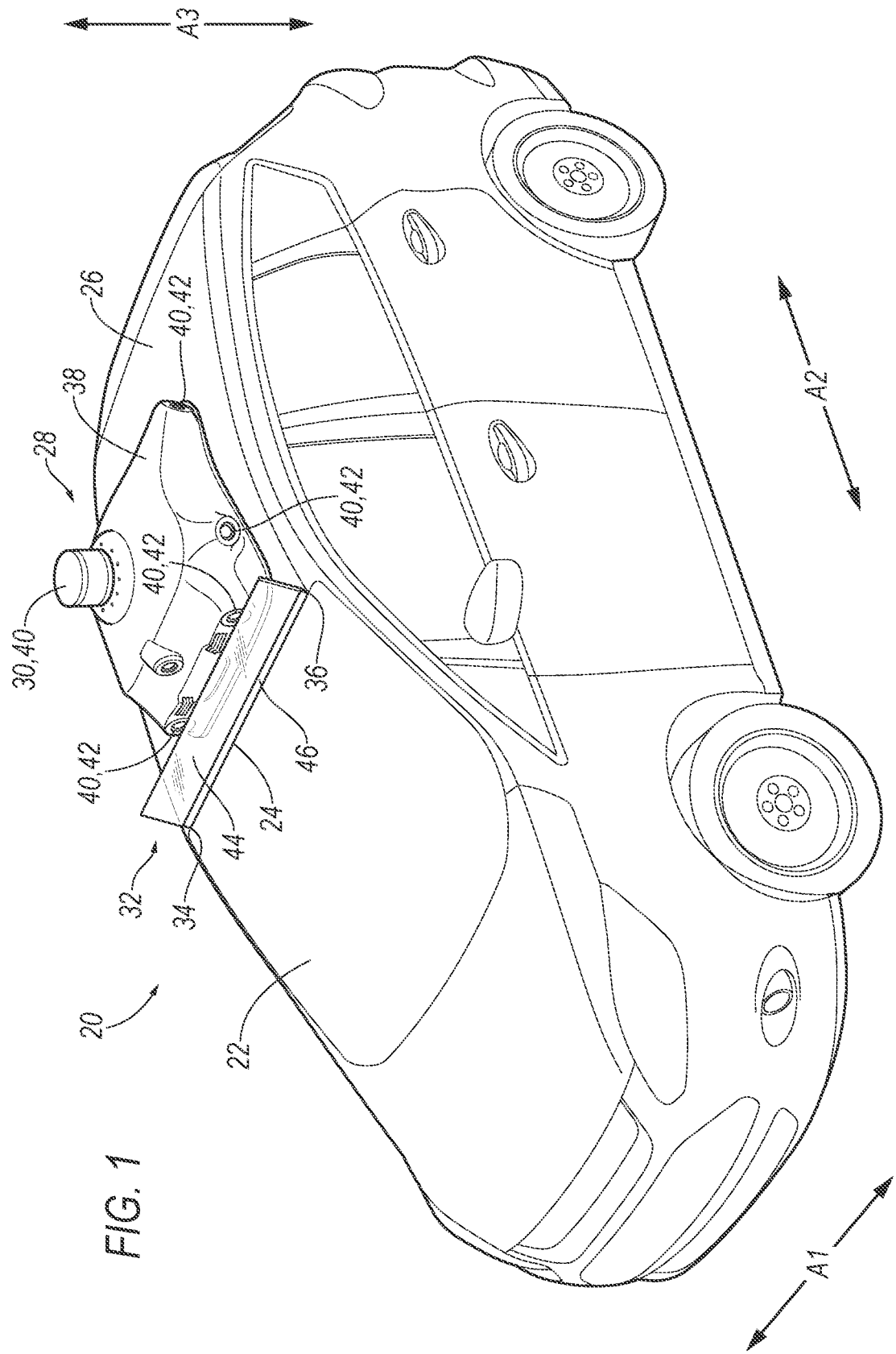
FIG. 1 is a perspective view of an example vehicle with a deflector and a sensor assembly.

A vehicle includes a windshield having a top edge. The vehicle includes a roof extending rearward from the top edge of the windshield. The vehicle includes a sensor assembly supported by the roof, the sensor assembly including at least one of a LIDAR sensor or a camera. The vehicle includes a deflector movable from a lowered position to a raised position and supported by the roof at the top edge of the windshield forward of and spaced from the sensor assembly.

The sensor assembly may include at least one camera.

The sensor assembly may include a housing and a LIDAR sensor rotatable relative to the housing.

The LIDAR sensor may extend upward from a top of the housing.

The deflector may be forward of and spaced from the housing.

The deflector may be wider than the housing.

The deflector may be elongated along a vehicle-lateral axis.

The top edge of the windshield may extend from a first end to a second end, and the deflector may extend from the first end to the second end of the top edge.

The vehicle may include a hinge between the roof and the deflector, the deflector movable about the hinge between the lowered position and the raised position.

The hinge may include a shape memory alloy.

The hinge may be a living hinge.

The deflector may be movable about a vehicle-lateral axis.

A sensor of the sensor assembly may define a field-of-view, the deflector in the raised position in the field-of-view, and the deflector in the lowered position outside the field-of-view.

The deflector may be transparent to light detectable by the sensor assembly.

The vehicle may include a computer having a processor and a memory storing instructions executable by the processor to move the deflector from the lowered position to the raised position based on data from a rain sensor.

The vehicle may include a computer having a processor and a memory storing instructions executable by the processor to move the deflector from the lowered position to the raised position based on data from a vehicle speed sensor.

With reference to the Figures, wherein like numerals indicate like parts throughout the several views, a vehicle 20 includes a windshield 22 having a top edge 24. The vehicle 20 includes a roof 26 extending rearward from the top edge 24 of the windshield 22. The vehicle 20 includes a sensor assembly 28 supported by the roof 26, the sensor assembly 28 including at least one LIDAR sensor 30. The vehicle 20 includes a deflector 32 movable from a lowered position to a raised position and supported by the roof 26 at the top edge 24 of the windshield 22 forward of and spaced from the sensor assembly 28. Movement of the deflector 32 enables to deflector 32 to selectively deflect air over the sensor assembly 28, e.g., when rain is detected and/or when the vehicle 20 is traveling above a threshold speed. Supporting the deflector 32 at the top edge 24 of the windshield 22 enables air deflected by the windshield 22 to be generally continuously deflected by the deflector 32, e.g., the air may travel along windshield 22 and the deflector 32 in the raised position without disruption therebetween. Spacing the deflector 32 from the sensor assembly 28 enables different sensor assemblies 28 to be used for the vehicle 20, and/or different mounting positions of the sensor assembly 28 on the roof 26, e.g., reducing the possible need for deflectors specific to a certain sensor assembly 28 or mounting position on the roof 26.

The vehicle 20 may be any suitable type of ground vehicle, e.g., a passenger or commercial automobile such as a sedan, a coupe, a truck, a sport utility, a crossover, a van, a minivan, a taxi, a bus, etc.

The vehicle 20 includes a vehicle frame. The vehicle frame may be of a unibody construction in which the frame is unitary with a vehicle body including frame rails, pillars, roof rails, etc. As another example, the body and frame may have a body-on-frame construction also referred to as a cab-on-frame construction in which the body and frame are separate components, i.e., are modular, and the body is supported on and affixed to the frame. Alternatively, the frame and body may have any suitable construction. The frame and body may be of any suitable material, for example, steel, aluminum, and/or fiber-reinforced plastic, etc.

The body may define a passenger cabin to house occupants, if any, of the vehicle 20. The passenger cabin may extend across the vehicle 20, i.e., from one side to the other side of the vehicle 20. The passenger cabin includes a front end and a rear end with the front end being in front of the rear end during forward movement of the vehicle 20.

The body may include the roof 26. The roof 26 of the vehicle 20 extends above and covers the passenger cabin, e.g., providing cover for occupants of the passenger cabin. The roof 26 may include cross-beams, an exterior panel, and a headliner. The cross-beams support the exterior panel, the headliner, etc. The cross-beams may be steel, aluminum, carbon fiber, or any other suitable material. The cross-beams may be elongated along a vehicle-lateral axis A1. The headliner and the exterior panel provide class-A surfaces to the roof 26, i.e., surfaces specifically manufactured to have a high-quality, finished aesthetic appearance free of blemishes, etc.

The windshield 22 is disposed at the front end of the passenger cabin. The windshield 22 may extend from one side of the vehicle 20 to the other side of the vehicle 20. The windshield 22 may extend, e.g., upward and rearward from an instrument panel of the vehicle 20 to top edge 24. The top edge 24 of the windshield 22 extends from a first end 34, e.g., at a right side of the vehicle 20, to a second end 36, e.g., at a left side of the vehicle 20. The top edge 24 may abut the roof 26. The roof 26 may extend rearward from the top edge 24 of the windshield 22, e.g., along a vehicle-longitudinal axis A2 that is perpendicular to the vehicle-lateral axis A1 and a vehicle-vertical axis A3. The windshield 22 may face in a forward direction from the passenger cabin. The windshield 22 may be any suitably transparent material, including glass, such as laminated and or tempered glass, and/or plastic.

The sensor assembly 28 may collect data, e.g., to autonomously and/or semi-autonomously operate the vehicle 20. The sensor assembly 28 may include a sensor housing 38 and one or more sensors 40. The sensor assembly 28 may be supported by the roof 26. For example, the housing 38 may be shaped to be attachable to the roof 26, e.g., may have a shape matching a contour of the roof 26. The housing 38 may be attached to the roof 26, which can provide the sensors 40 with an unobstructed field of view of an area around the vehicle 20. The housing 38 may be formed of, e.g., plastic or metal. The sensor assembly 28 may be supported rearward and spaced from the top edge 24 of the windshield 22 and the deflector 32.

The sensor 40 can obtain one or more measurements of one or more physical phenomena. Some sensors 40 may detect the position or orientation of the vehicle 20, for example, global positioning system GPS sensors; accelerometers such as piezo-electric or microelectromechanical systems MEMS; gyroscopes such as rate, ring laser, or fiber-optic gyroscopes; inertial measurements units IMU; and magnetometers. Some sensors 40 may detect the external world, for example, radar sensors 40, scanning laser range finders, light detection and ranging LIDAR sensors 30, and image processing sensors such as cameras 42. To provide just a few non-limiting examples, sensor data could include data for determining a location of an object, a speed of an object, a type of an object, a slope of a roadway, etc.

The LIDAR sensor 30 detects distances to objects by emitting laser pulses and measuring the time of flight for the pulse to travel to the object and back. The LIDAR sensor 30 may be rotatable relative to the housing 38. The LIDAR sensor 30 may extend upward from a top of the housing 38, e.g., along the vehicle-vertical axis A3. For example, the LIDAR sensor 30 can be disposed on top of the housing 38 at a highest point of the housing 38. The housing 38 may include an aperture through which the LIDAR sensor 30 passes. The aperture may round, e.g., having a circular or slightly elliptical shape. The LIDAR sensor 30 may include a base, a motor, a sensing device, and a shell. The shell encloses the sensing device, e.g., protecting the sensing device from rain, debris, etc. The base may be attached to and fixed relative to the housing 38. The motor may be attached to and fixed relative to the base. The motor may be operatively coupled to the shell and the sensing device to rotate the shell and the sensing device relative to the housing 38.

Each of the sensors 40 defines a field-of-view FOV. The field-of-view FOV is a volume from which light, or other datable medium, is detectable by the respective sensor 40. For example, the field-of-view FOV for the LIDAR sensor 30 may extend 360 degrees about a vertical access, e.g., collecting data from in front, behind, and to the sides of the vehicle 20. The field-of-view FOV may be bounded between upper and lower vertical limits. As another example, the field-of-view FOV of each camera 42 may be bounded between upper and lower vertical limits, and between left and right lateral limits.

The deflector 32 may deflect air, rain droplets, washer fluid, etc., e.g., upward away from the roof 26 and over the sensor assembly 28. The deflector 32 is supported by the roof 26 at the top edge 24 of the windshield 22 forward of and spaced from the sensor assembly 28, e.g., forward of and spaced from the housing 38. The deflector 32 may be fixed to, for example, the cross-beams and/or the exterior panel of the roof 26. The deflector 32 may include a main portion 44 that is transparent to light detectable by the sensor assembly 28, e.g., laser light emitted and received by the LIDAR sensor 30 and/or visual light detected by the cameras 42. For example, the main portion 44 may include glass, such as laminated and or tempered glass, plastic and/or any other suitable material.

The deflector 32 may be elongated along the vehicle-lateral axis A1. In other words, a width of the deflector 32 along the vehicle-lateral axis A1 may be greater than a length and a height of the deflector 32 perpendicular to the width. The deflector 32 may be wider than the housing 38. For example, the deflector 32 may extend vehicle outboard beyond both a right side and a left side of the housing 38 along the vehicle-lateral axis A1. As another example, the deflector 32 may extend along the vehicle-lateral axis A1 from the first end 34 of the top edge 24 of the windshield 22 to the second end 36 of the top edge 24 of the windshield 22.

The deflector 32 may be movable from the lowered position to the raised position, and vice versa. The deflector 32 may be movable about the vehicle-lateral axis A1. For example, the vehicle 20 may rotate about the vehicle-lateral axis A1 between the lowered position and the raised position.

Figure 2:
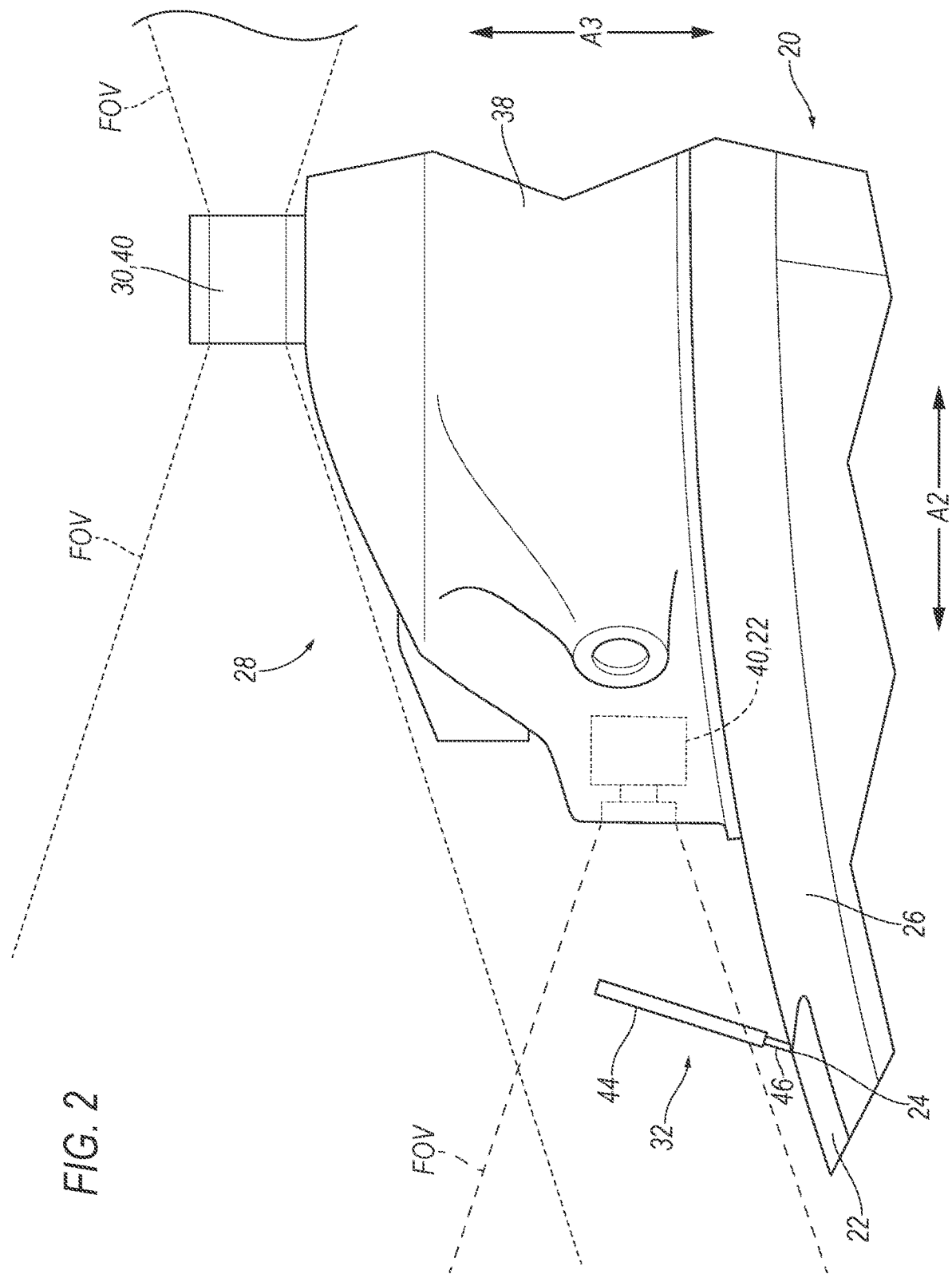
FIG. 2 is a side view of a portion of the vehicle with the deflector in a raised position.

With reference to FIG. 2, the deflector 32 in the raised position may be in the field-of-view FOV of a sensor 40 of the sensor assembly 28. For example, light detected by the LIDAR sensor 30 and/or one or more of the cameras 42 may travel a path that extends through e.g., the main portion 44 of, the deflector 32. The deflector 32 in the raised position may extend away from the roof 26, e.g., upward and rearward from the top edge 24 of the windshield 22. The deflector 32 in the raised position may provide direct air, rain, washer fluid, etc. over the sensor assembly 28, e.g., when the vehicle 20 is traveling at a threshold speed. Directing air, rain, washer fluid, etc., over the sensor assembly 28 may increase a quality of data collected by the sensor assembly 28. For example, the air directed over the sensor assembly 28 may permit air vents of the sensor assembly 28 to better provide air curtains in front of the sensors 40 of the sensor assembly 28, e.g., relative to if the air is permitted to flow into the sensor assembly 28. As another example, the rain and washer fluid directed over the sensor assembly 28 may be less likely to impact lenses of the sensors 40, e.g., relative to if the rain and washer fluid is permitted to flow into the sensor assembly 28.

Figure 3:
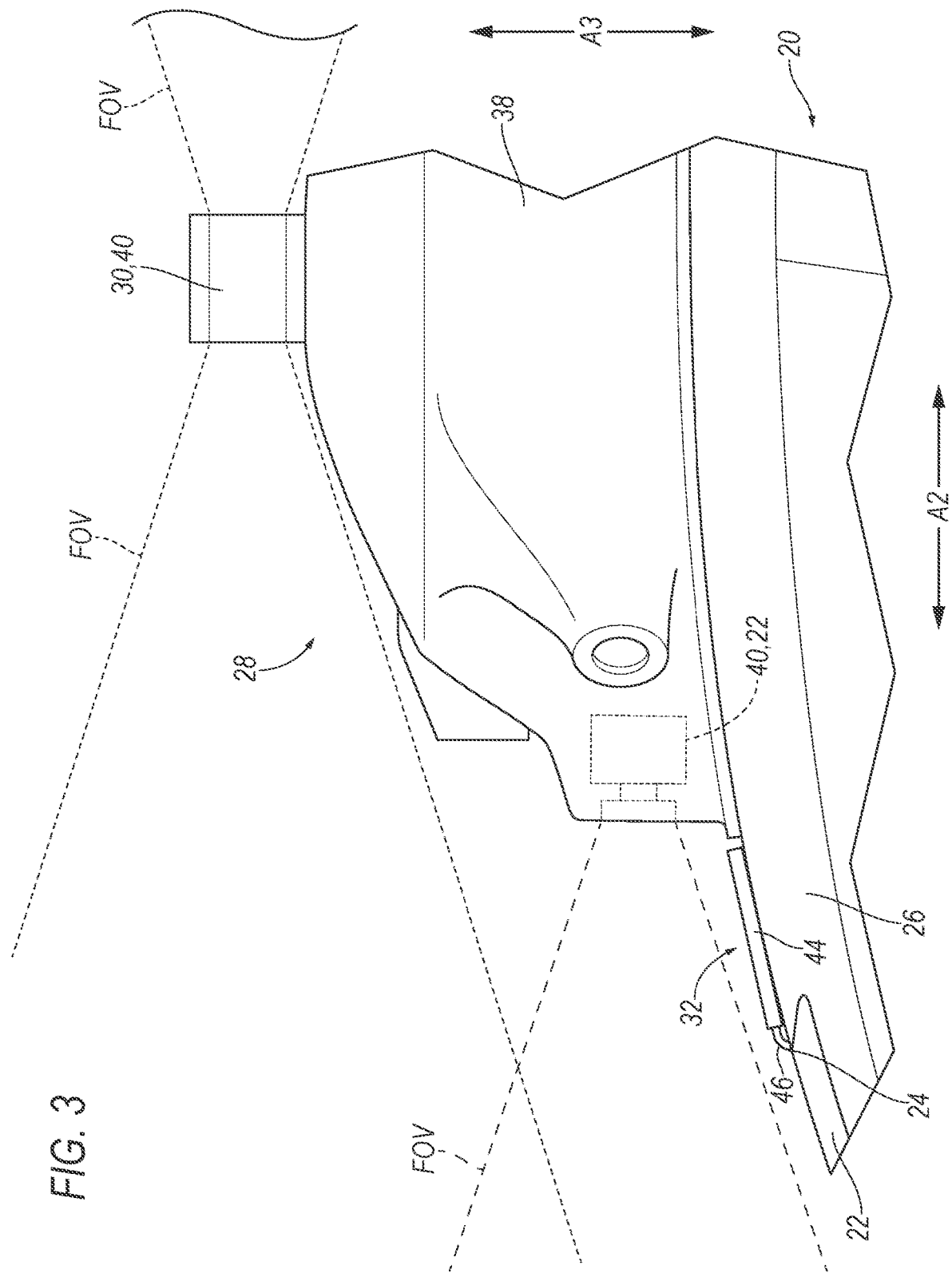
FIG. 3 is a side view of the portion of the vehicle with the deflector in a lowered position.
Figure 4:
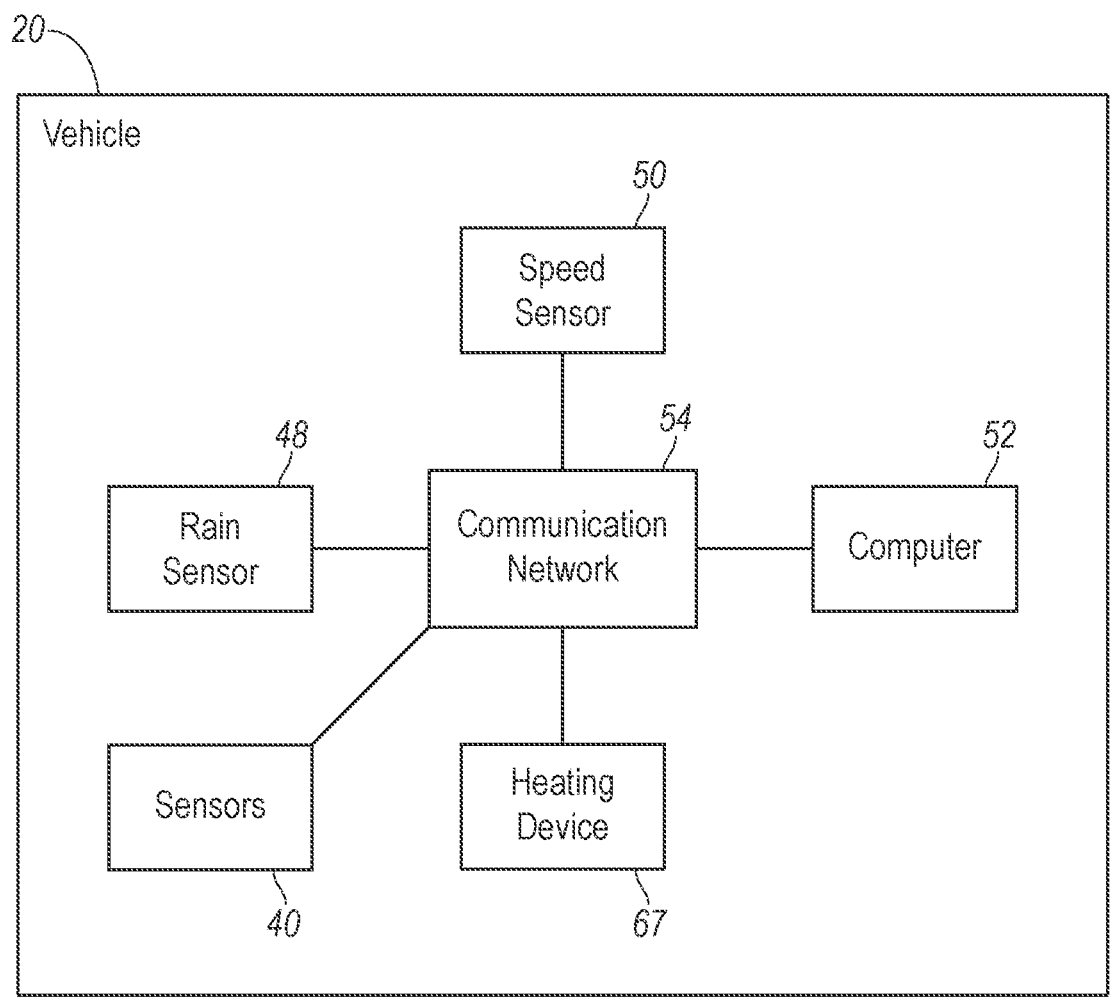
FIG. 4 is a block diagram of components of the vehicle.

With reference to FIG. 3, the deflector 32 in the lowered position may be outside the field-of-view FOV of the sensors 40 of the sensor assembly. For example, light detected by the LIDAR sensor 30 and the cameras 42 may travel a path that does not extend through the deflector 32. The deflector 32 in the lowered position may extend along the roof 26, e.g., rearward from the top edge 24 of the windshield 22. The deflector 32 in the lowered position may provide lower wind resistance and decreased susceptibility to being damaged or soiled, e.g., compared to the raised position.

Returning to FIGS. 1-4, a hinge 46 may be between the roof 26 and the deflector 32. The hinge 46 may be connected to the roof 26 and the deflector 32. The hinge 46 enables rotation and inhibits translation of the deflector 32. In other words, the deflector 32 may be movable about the hinge 46 between the lowered position and the raised position. The hinge 46 may be a living hinge. In other words, the hinge 46 may include a unitary flexible material that deforms to permit movement of the deflector 32. Unitary means a single, uniform piece of material with no seams, joints, fasteners, or adhesives holding it together, i.e., formed together simultaneously as a single continuous unit, e.g., by machining from a unitary blank, molding, forging, casting, 3-D printing, etc. Non-unitary components, in contrast, are formed separately and subsequently assembled, e.g., by threaded engagement, welding, etc. The hinge 46 may be any other suitable type, e.g., including knuckles and a hinge pin.

The hinge 46 may include a shape memory alloy. Shape memory alloys can be deformed when cool, e.g., at nominal temperature, but returns to a pre-deformed ("remembered") shape when heated. The pre-deformed shape may be the raised position. For example, at nominal temperature the shape memory alloy may be deformed and the deflector 32 at the lowered position (e.g., from weight of the deflector 32). At a heated temperature above nominal the shape memory alloy may return to the pre-deformed shape with the deflector 32 at the raised position. The shape memory alloy may include, for example, copper-aluminum-nickel and nickel-titanium. A heating device 47, illustrated in FIG. 4, may be coupled to the shape memory alloy. The heating device 47 may extend along a length of the hinge 46. For example, the heating device 47 may include a resistor that coverts electric current to heat energy. The resistor may be operatively coupled to the shape memory alloy to transfer heat energy from the resistor to the shape memory alloy. Additionally or alternately, one or more other actuators may be operatively coupled to move the deflector 32 between the lowered position and the raised position. The actuator may include a linear actuator, a servo, or any other suitable electro-mechanical and/or hydraulic system.

The vehicle 20 may include a rain sensor 48 that detects rain, e.g., as droplets on the windshield 22. The rain sensor 48 may, for example, include an infrared light emitter and an infrared light detector. Rain, or other liquid droplets, on the windshield 22 may be detected based on a decrease of infrared light detected by the deflector 32, e.g., caused by dispersion or scattering of infrared light from the infrared light emitter by the rain droplets on the windshield 22. The rain sensor 48 may include any other suitable structure for detecting rain near or on the vehicle 20.

The vehicle 20 may include a speed sensor 50 that detect a speed of the vehicle 20. The speed sensor 50 may include, for example, a hall effect sensor that detects passing teeth of a ring gear coupled to a powertrain component, such as an axle shaft, wheel, etc. A number of teeth detected passing in a specified amount of time can be used to calculate a rotational speed of the ring gear and an associated vehicle 20 speed. The speed sensor 50 may include any other suitable structure for detecting the speed of the vehicle 20.

The vehicle 20 includes a computer 52 having a processor and a memory. The memory includes one or more forms of computer readable media, and stores instructions executable by the processor for performing various operations, including as disclosed herein. For example, the computer 52 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 52 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the computer 52. The memory can be of any type, e.g., hard disk drives, solid state drives, servers, or any volatile or non-volatile media. The memory can store the collected data sent from the sensors 40, 48, 50. The memory can be a separate device from the computer 52, and the computer 52 can retrieve information stored by the memory via a communication network 54 in the vehicle 20, e.g., over a CAN bus, a wireless network, etc. Alternatively or additionally, the memory can be part of the computer 52, e.g., as a memory of the computer 52.

The computer 52 may include or be communicatively coupled to, e.g., via the communication network 54 such as a communications bus as described further below, more than one processor, e.g., included in components such as sensors 40, 48, 50, electronic control units (ECUs) or the like included in the vehicle 20 for monitoring and/or controlling various vehicle components, e.g., a powertrain controller, a brake controller, a steering controller, etc. The computer 52 is generally arranged for communications on the communication network 54 that can include a bus in the vehicle 20 such as a controller area network CAN or the like, and/or other wired and/or wireless mechanisms. Alternatively or additionally, in cases where the computer 52 actually comprises a plurality of devices, the communication network 54 may be used for communications between devices represented as the computer 52 in this disclosure. Various vehicle components, e.g., the sensors 40 of the sensor assembly 28, the rain sensor 48, the speed sensor 50, etc., may provide data to the computer 52 via the communication network 54. The computer 52 may command various vehicle 20 components, e.g., movement of the deflector 32, via the communication network 54.

The computer 52 may include programming to operate one or more of vehicle brakes, propulsion e.g., control of acceleration in the vehicle 20 by controlling one or more of an internal combustion engine, electric motor, hybrid engine, etc., steering, climate control, interior and/or exterior lights, etc., as well as to determine whether and when the computer 52, as opposed to a human operator, is to control such operations. Additionally, the computer 52 may be programmed to determine whether and when a human operator is to control such operations.

The computer 52 may include programming to move the deflector 32 from the lowered position to the raised position, and vice versa. For example, the computer 52 may move the deflector 32 to the raised position by transmitting a command, e.g., via the communication network 54, to the heating device 47 to increase a voltage and/or current supplied to resistor, providing heat to the shape memory alloy of the hinge 46. The computer 52 may move the deflector 32 to the lowered position by transmitting a command to the heating device 47 to decrease or eliminate the voltage and/or current supplied to resistor, permitting the shape memory alloy of the hinge 46 to return to nominal temperate. As another example, the computer 52 may move the deflector 32 to the raised position or lowered position by transmitting a command to an actuator or other device coupled to the deflector 32. The command, for example, may specify increase or decrease of a length of a linear actuator, may specify a rotation position of a servo, etc.

The computer 52 may include programming to move the deflector 32 from the lowered position to the raised position or from the raised position to the lowered position based on data from the rain sensor 48, the speed sensor 50, and/or other sensors 40. For example, the computer 52 may move the deflector 32 from the lowered position to the raised position in response to receiving information, e.g., via the communication network 54, from the rain sensor 48 indicating that rain is detected. The computer 52 may move the deflector 32 from the raised position to the lowered position in response to receiving information from the rain sensor 48 indicating that rain is not detected. The computer 52 may move the deflector 32 from the lowered position to the raised position in response to receiving information from the speed sensor 50 indicating that the vehicle 20 is traveling above a threshold speed. The computer 52 may move the deflector 32 from the raised position to the lowered position in response to receiving information from the speed sensor 50 indicating that the vehicle 20 is traveling below the threshold speed. The threshold speed may be predetermined and stored, for example, in the memory. The threshold speed may be predetermined based on empirical testing, such as wind tunnel testing, computer 52 modeling, etc., that indicates a speed at which air deflected by the deflector 32 in the raised position is directed over the sensor assembly 28.

The disclosure has been described in an illustrative manner, and it is to be understood that the terminology which has been used is intended to be in the nature of words of description rather than of limitation. The adjectives "first," "second," "third," and "fourth" are used throughout this document as identifiers and are not intended to signify importance, order, or quantity. Use of "in response to," "based on," and "upon determining" herein indicates a causal relationship, not merely a temporal relationship. Many modifications and variations of the present disclosure are possible in light of the above teachings, and the disclosure may be practiced otherwise than as specifically described.

The invention claimed is:

1. A vehicle, comprising:
a windshield having a top edge;
a roof extending rearward from the top edge of the windshield;
a sensor assembly supported by the roof, the sensor assembly including at least one of a LIDAR sensor or a camera; and
a deflector movable from a lowered position to a raised position and supported by the roof at the top edge of the windshield forward of and spaced from the sensor assembly.

2. The vehicle of claim 1, wherein the sensor assembly includes at least one camera.

3. The vehicle of claim 1, wherein the sensor assembly includes a housing and a LIDAR sensor rotatable relative to the housing.

4. The vehicle of claim 3, wherein the LIDAR sensor extends upward from a top of the housing.

5. The vehicle of claim 4, wherein the deflector is forward of and spaced from the housing.

6. The vehicle of claim 5, wherein the deflector is wider than the housing.

7. The vehicle of claim 1, wherein the deflector is elongated along a vehicle-lateral axis.

8. The vehicle of claim 1, wherein the top edge of the windshield extends from a first end to a second end, and the deflector extends from the first end to the second end of the top edge.

9. The vehicle of claim 1, further comprising a hinge between the roof and the deflector, the deflector movable about the hinge between the lowered position and the raised position.

10. The vehicle of claim 9, wherein the hinge includes a shape memory alloy.

11. The vehicle of claim 9, wherein the hinge is a living hinge.

12. The vehicle of claim 1, wherein the deflector is movable about a vehicle-lateral axis.

13. The vehicle of claim 1, wherein a sensor of the sensor assembly defines a field-of-view, the deflector in the raised position is in the field-of-view, and the deflector in the lowered position is outside the field-of-view.

14. The vehicle of claim 1, wherein the deflector is transparent to light detectable by the sensor assembly.

15. The vehicle of claim 1, further comprising a computer having a processor and a memory storing instructions executable by the processor to move the deflector from the lowered position to the raised position based on data from a rain sensor.

16. The vehicle of claim 1, further comprising a computer having a processor and a memory storing instructions executable by the processor to move the deflector from the lowered position to the raised position based on data from a vehicle speed sensor.

* * * * *